United States Patent
Girisch et al.

(10) Patent No.: US 11,827,170 B2
(45) Date of Patent: Nov. 28, 2023

(54) GAS-FILLABLE SUPPORT MEANS FOR A MOTOR VEHICLE AND MOTOR VEHICLE EQUIPPED THEREWITH

(71) Applicant: Bayerische Motoren Werke Aktiengesellschaft, Munich (DE)

(72) Inventors: Juergen Girisch, Munich (DE); Bernhard Schmid, Hallbergmoos (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/289,931

(22) PCT Filed: Oct. 14, 2019

(86) PCT No.: PCT/EP2019/077721
§ 371 (c)(1),
(2) Date: Apr. 29, 2021

(87) PCT Pub. No.: WO2020/088920
PCT Pub. Date: May 7, 2020

(65) Prior Publication Data
US 2022/0009441 A1 Jan. 13, 2022

(30) Foreign Application Priority Data
Oct. 31, 2018 (DE) ...................... 10 2018 127 214.6

(51) Int. Cl.
*B60R 21/231* (2011.01)
*B60R 21/205* (2011.01)
(Continued)

(52) U.S. Cl.
CPC ............ *B60R 21/206* (2013.01); *B60R 21/16* (2013.01); *B60R 21/205* (2013.01);
(Continued)

(58) Field of Classification Search
CPC ... B60R 21/231; B60R 21/205; B60R 21/045; B60R 21/206; B60R 21/264;
(Continued)

(56) References Cited

U.S. PATENT DOCUMENTS 3,768,830 A * 10/1973 Hass ...................... B60R 21/233
280/732
3,801,126 A * 4/1974 Knight, IV ........... B60R 21/276
180/90

(Continued)

FOREIGN PATENT DOCUMENTS

CN 101032950 A 9/2007
CN 105609682 A 5/2016
(Continued)

OTHER PUBLICATIONS

PCT/EP2019/077721, International Search Report dated Dec. 4, 2019 (Two (2) pages).

(Continued)

*Primary Examiner* — Keith J Frisby
(74) *Attorney, Agent, or Firm* — Crowell & Moring LLP

(57) ABSTRACT

A support apparatus includes a gas-fillable support that is connectable to a gas generator. The gas-fillable support is securable to a body of a motor vehicle and has a first operating state which exists before the gas generator is activated and which has a first volume. The gas-fillable support has a second operating state which exists after the gas generator is activated and which has a second volume which is greater than the first volume. The gas-fillable support in the second operating state is contactable against a first portion which is operationally connected to the body and is contactable against a second portion which is operationally connected to the body and which is remote from the first end portion. A first mechanical strength of the gas-fillable support in the first operating state is less than a
(Continued)

second mechanical strength of the gas-fillable support in the second operating state.

3 Claims, 3 Drawing Sheets

(51) Int. Cl.
*B60R 21/16* (2006.01)
*B60R 21/2338* (2011.01)
*B60R 21/206* (2011.01)
*B60R 21/264* (2006.01)
*B60R 21/00* (2006.01)

(52) U.S. Cl.
CPC ........ *B60R 21/231* (2013.01); *B60R 21/2338* (2013.01); *B60R 21/264* (2013.01); *B60R 2021/0048* (2013.01); *B60R 2021/0051* (2013.01); *B60R 2021/23169* (2013.01); *B60R 2021/23386* (2013.01)

(58) Field of Classification Search
CPC ..... B60R 21/16; B60R 21/20; B60R 21/2338; B60R 2021/0407; B60R 2021/23386; B62D 25/14
USPC ............ 280/728.1, 728.2, 730.1, 732, 743.1, 280/743.2; 180/274, 271
See application file for complete search history.

(56) References Cited

U.S. PATENT DOCUMENTS

| | | | |
|---|---|---|---|
| 4,130,298 A | 12/1978 | Shaunnessey | |
| 5,797,620 A * | 8/1998 | Eyrainer | B60R 21/206 280/743.1 |
| 5,845,937 A | 12/1998 | Smith | |
| 6,017,059 A * | 1/2000 | Taubenberger | B60R 21/23184 280/752 |
| 7,441,832 B2 * | 10/2008 | Ratajski | B60R 21/13 296/187.06 |
| 2005/0161273 A1 * | 7/2005 | Makita | B60R 19/205 180/274 |
| 2012/0292894 A1 * | 11/2012 | Kobayashi | B60R 21/201 280/730.1 |
| 2018/0345895 A1 * | 12/2018 | Farooq | B60R 21/205 |
| 2019/0315470 A1 * | 10/2019 | Humbert | B64D 11/0621 |

FOREIGN PATENT DOCUMENTS

| | | |
|---|---|---|
| CN | 105818777 A | 8/2016 |
| CN | 205469278 U | 8/2016 |
| CN | 106004770 A | 10/2016 |
| DE | 196 46 776 A1 | 5/1998 |
| DE | 100 21 325 A1 | 2/2001 |
| DE | 101 23 207 C1 | 7/2002 |
| DE | 102 56 024 A1 | 6/2004 |
| DE | 10 2012 018 464 A1 | 3/2013 |
| DE | 20 2016 101 532 U1 | 8/2016 |
| WO | WO 2012/158072 A1 | 11/2012 |

OTHER PUBLICATIONS

German Search Report issued in German application No. 10 2018 127 214.6 dated Jun. 25, 2019, with Statement of Relevancy (Nine (9) pages).

English-language Chinese Office Action issued in Chinese application No. 201980046292.3 dated Jun. 1, 2022 (Six (6) pages).

* cited by examiner

GAS-FILLABLE SUPPORT MEANS FOR A MOTOR VEHICLE AND MOTOR VEHICLE EQUIPPED THEREWITH

BACKGROUND AND SUMMARY OF THE INVENTION

The present invention relates to a gas-fillable support means for a motor vehicle and a motor vehicle which is equipped therewith.

Increasingly, there is a desire for motor vehicles with comparatively small instrument panels or even completely without instrument panels since they, in comparison with the known prior art, enable more space for vehicle occupants. However, there is the problem in this instance that motor vehicles which are provided with small or no instrument panels, in the event of an accident, in particular in the event of a side-on crash, could have a reduced rigidity compared with the known motor vehicles.

An object of the present invention is to solve the mentioned problem, that is to say, consequently to increase the rigidity of a motor vehicle which has only a small or no instrument panel in the event of an accident, but to provide more space in the motor vehicle for a vehicle occupant in a situation in which there is no accident.

This object is achieved with a gas-fillable support means.

The invention is based on the recognition that an increase of the rigidity of the motor vehicle, in particular the body thereof, is desirable only in the event of an accident, while it can be dispensed with in a situation where there is no accident, in particular when driving.

The gas-fillable support means according to the invention is configured to be secured to a body of a motor vehicle and to extend over a length substantially in the transverse direction of the body. The securing is carried out using securing means which are known per se and which preferably enable a replacement of the support means, in particular after it has been used. An end wall located in the front region of the motor vehicle can advantageously be used as a securing location. Alternatively or additionally, a support means according to the invention may be arranged in the central or rear region of the motor vehicle. Further alternatively or additionally, the support means can be secured at at least one extreme end, in a particularly preferred manner at this end and an opposing end, to the motor vehicle, in particular between the A-pillars. The length of the support means which extends in the transverse direction of the body of the motor vehicle substantially corresponds according to a preferred embodiment to the length of the end wall and/or the spacing of two vehicle struts which are spaced apart from each other in a vehicle transverse direction, in particular the A-pillars.

The gas-fillable support means according to the invention is operationally connected to at least one gas generator. The gas generator may be constructed as a pyrotechnic gas generator, cold gas generator or hybrid gas generator. On the whole, at least one gas generator may be located in the support means or outside it, wherein in the latter case there is an operational connection between the support means and the gas generator, in particular in the form of a hose.

In a first operating state which exists before the gas generator is activated and which represents an accident-free state, the support means according to the invention has a first volume. In a second operating state which exists after the gas generator has been activated, the support means according to the invention has a second volume which is greater than the first volume. To this end, the support means is inflated in the event of an accident by the at least one gas generator and filled tightly with air.

The support means according to the invention is further configured in the second operating state to be in abutment with a first end portion against a first portion which is operationally connected to the body and to be in abutment with a second end portion against a second portion which is operationally connected to the body and which is remote from the first end portion, wherein the mechanical strength of the support means in the second operating state—brought about by the gas volume which is produced by means of the gas generator—is greater than in the first operating state. The first portion or second portion are in particular the left A-pillar and right A-pillar when viewed in the travel direction of the motor vehicle, or a component which is secured to the body and which is located between them.

The gas-fillable support means according to the invention may be constructed from any suitable material. In a particularly preferred manner, this material is a polyamide or a polyethylene terephthalate.

According to another advantageous embodiment, the gas-fillable support means according to the invention is configured in such a manner that its volume in the event of an accident increases not only in the transverse direction, but also in the longitudinal vehicle direction, that is to say, in the direction of occupants in the motor vehicle.

Advantageously, there is consequently provided a generally specific and temporarily effective lateral support which, in the event of no accident, takes up comparatively little space in the motor vehicle, while in the event of an accident it is constructed as a gas-filled, rigidity-increasing and load-absorbing means.

The gas-fillable support means according to the invention is advantageously constructed in a particularly simple manner if it has a gas-fillable hose or is constructed as such a hose. In the same manner as the support means disclosed above, the hose may also have gas outlet means, through which the gas after a defined period of time can escape from the support means according to the invention which is inflated in the event of an accident. The gas outlet means may in particular be constructed as an outlet valve and/or be in the form of defined openings in the outer skin of the support means or the hose through which the gas is gradually discharged.

According to the basic principle, the gas-fillable support means according to the invention may in the event of no accident and in the event of an accident be connected directly to the motor vehicle, in particular the end wall. Alternatively, the gas-fillable support means may have at least one catch strap which is configured to be connected to a portion which is operationally connected to the body, in particular the end wall. In the event of an accident, the support means which is being inflated can consequently move from a starting location, in particular an end wall, selectively to an end location, in particular in the vehicle interior in order to assume a defined position at that location.

According to a preferred embodiment, the gas-fillable support means is operationally connected to at least one airbag. In particular, the gas-fillable support means according to the invention, in particular the hose disclosed above, may be connected in fluid terms to at least one airbag so that it acts as a gas source indirectly or directly for the airbag. When the support means is filled with gas, therefore, the at least one airbag is also inflated at the same time or in a time-delayed manner. Alternatively or additionally, there may be provision for the at least one airbag to have an individual gas generator.

In a particularly advantageous manner, the airbag which is operationally connected to the gas-filled support means according to the invention is constructed as a head airbag or knee airbag.

The above-mentioned object is also achieved with a motor vehicle which has at least one gas-fillable support means of the above-disclosed type. The advantages set out apply accordingly.

According to a preferred embodiment of the motor vehicle, at least one gas-fillable support means is arranged on an end wall of the body of the motor vehicle.

According to another preferred embodiment of the motor vehicle, the support means which is in the second operating state thereof is in abutment at one end against an A-pillar and is in abutment at the other end against a means which is operationally connected or secured to the body, in particular a steering wheel column trim, a console or another means which is located in the motor vehicle interior and which is securely connected thereto.

There is set out below with reference to the appended Figures which are not to scale, a detailed, non-prejudicial, in particular non-limiting, description of embodiments of the present invention. Identical elements which are contained therein are given the same reference numerals.

DETAILED DESCRIPTION OF THE DRAWINGS

Figure 1A:
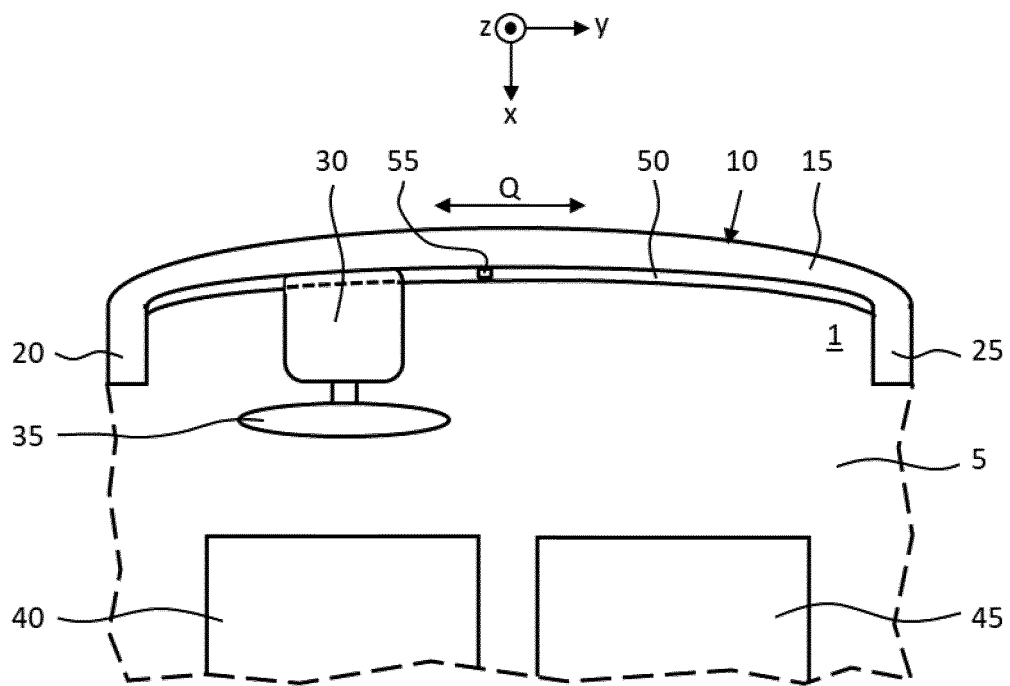
FIG. 1A is a simplified plan view of a motor vehicle interior which is located in the front region of a motor vehicle according to the invention and in which a support means according to the invention which is located in a first operating state is arranged.

FIG. 1A is a plan view of a portion of a motor vehicle 1 according to the invention. In specific terms, there is shown a portion of a motor vehicle interior 5 which has an end wall 15 which forms a portion of a body 10, a left A-pillar 20 when viewed in the main travel direction, a right A-pillar 25, a steering wheel column trim 30 including steering wheel 35 and a partially illustrated driver's seat 40 and passenger seat 45. At the end wall 15 there is arranged a support means 50 which is in a first operating state and which comprises a gas generator 55 and which extends in the transverse vehicle direction Q from the left A-pillar 20 as far as the right A-pillar 25. The first operating state refers to the state in which the motor vehicle is in an accident-free state and the support means 50 is not filled with fluid.

Figure 1B:
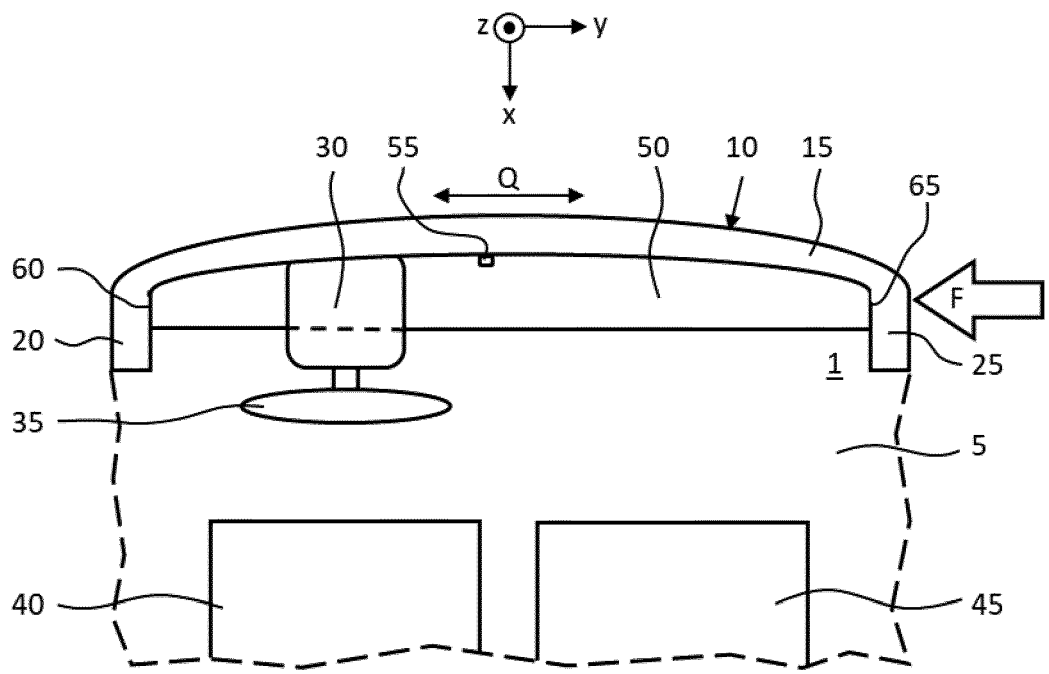
FIG. 1B shows the arrangement illustrated in FIG. 1A in a second operating state.

The portion of the motor vehicle 1 illustrated in FIG. 1A is shown again in FIG. 1B, wherein the support means 50 is now in a second operating state. As a result of an accident-related introduction of a force F which according to the embodiment here suddenly acts on the right A-pillar 25, the gas generator 55 produces in the support means 50 which is constructed as a hose a gas which is not shown here and which drives the flank of the support means 50 adjacent to the driver's seat 40 and the passenger seat 45 in the direction of the motor vehicle interior 5. The gas production is maintained until the support means 50 is tightly filled and has a very high mechanical strength, in particular pressure resistance. As can be derived from FIG. 1B, the left end portion 60 of the support means 50 which is filled with gas is in abutment with the left A-pillar 20 and the right end portion 65 of the support means 50 which is filled with gas is in abutment against the right A-pillar 25, whereby there is a distribution of the force F over the right A-pillar 25 into the body 10. Consequently, the support means 50 supports the front region of the motor vehicle interior 5 illustrated in the Figure.

Figure 2:
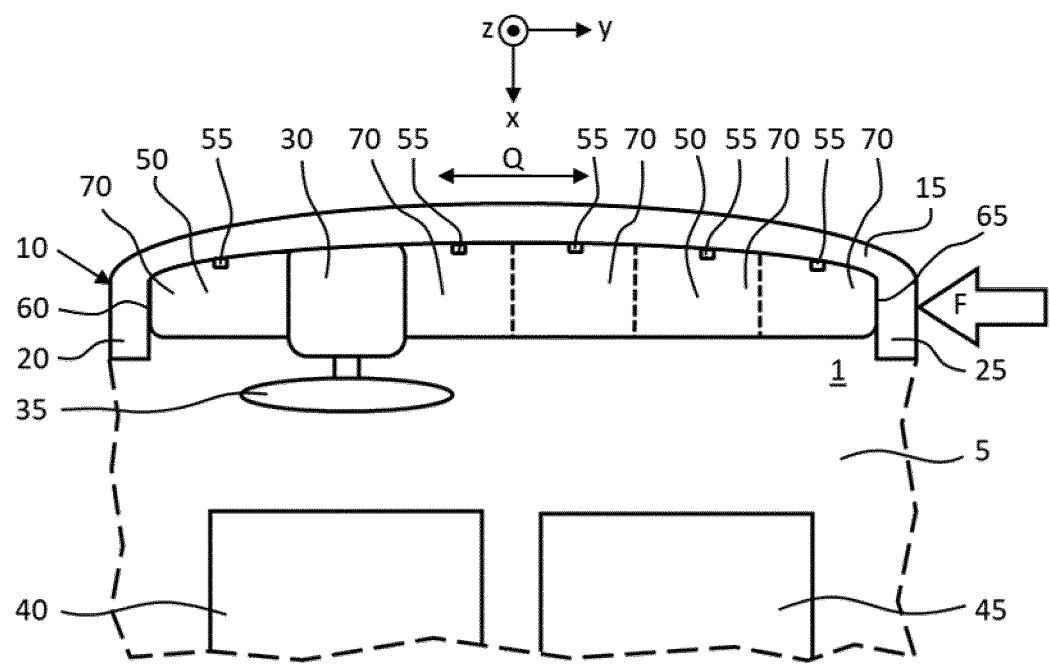
FIG. 2 illustrates an alternative to the device shown in FIG. 1B.

In FIG. 2, an alternative embodiment to FIG. 1B is illustrated in the second operating state. In this instance, a first support means 50 which is located between the left A-pillar 20 and the steering wheel column trim 30 and a second support means 50 which is located between the steering wheel column trim 30 and the right A-pillar 25 is provided. The first support means 50 has an individual chamber 70 which is tightly filled with a gas not illustrated here by means of a single gas generator 55. In contrast, the second support means 55 has a series of chambers 70 which are fluidically connected to each other and which are tightly filled with gas by means of a gas generator 55 in each case.

Figure 3:
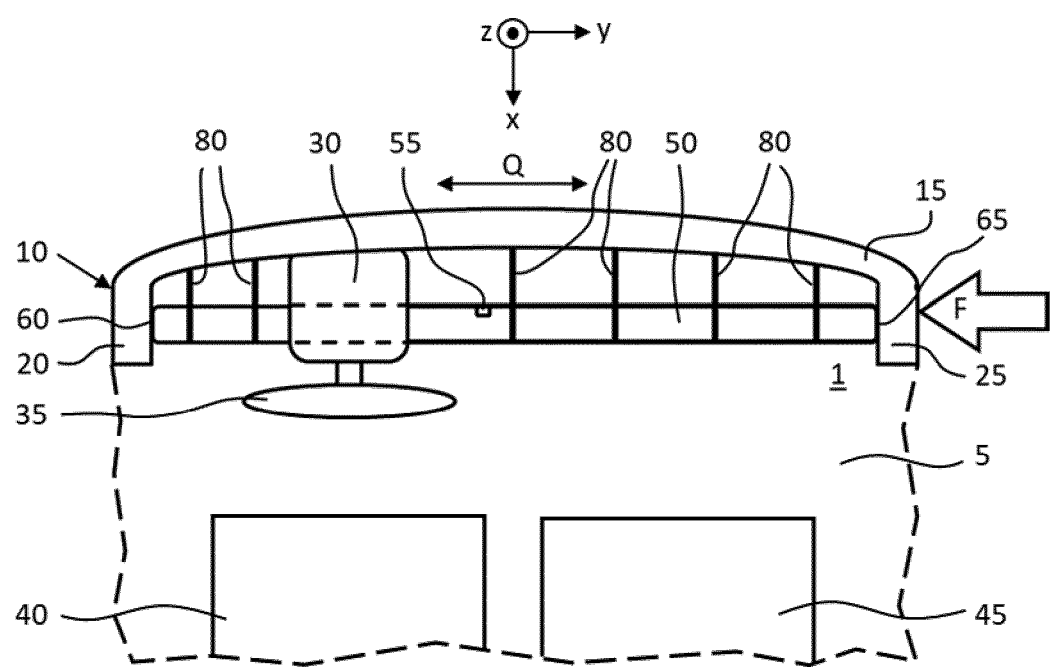
FIG. 3 illustrates another alternative to the device shown in FIG. 1B.

In FIG. 3, another alternative embodiment to FIGS. 1B and 2 is shown in the second operating state. An individual support means 50 which receives a gas generator 55 is tightly filled with gas. It is supported with the left end portion 60 thereof against the left A-pillar 20 and with the right end portion 65 thereof against the right A-pillar 25, but is released from the end wall 15 with the end thereof remote from the driver's seat 40 or the passenger seat 45 and spaced apart from it. Its position in the longitudinal vehicle direction x is according to this embodiment secured by means of a series of catch straps 80 which are distributed over the transverse direction Q and which are connected at one end to the end wall 15, at the other end to the support means 50. The catch straps 80 shown here cover the tightly filled support means over the entire extent thereof in the x direction. However, this is not necessarily the case; instead, there may also be provision for some of the catch straps 80 or all the catch straps 80 to be secured to the end remote from the driver's seat 40 or the passenger seat 45 or the remote side of the support means 50.

Figure 4A:
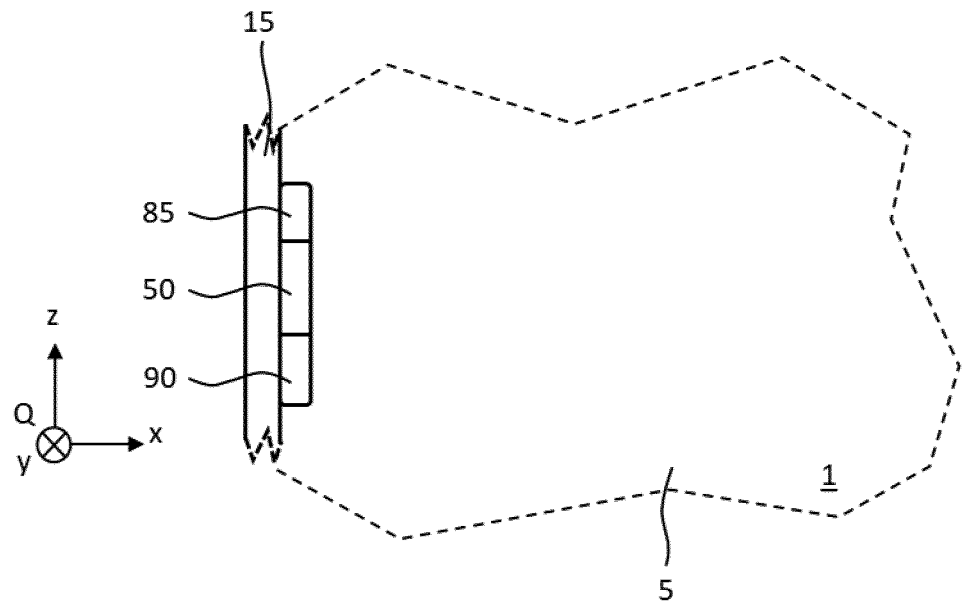
FIG. 4A is a simplified side view of a motor vehicle interior which is located in the front region of a motor vehicle according to the invention and in which an alternative support means which is in a first operating state is arranged.
Figure 4B:
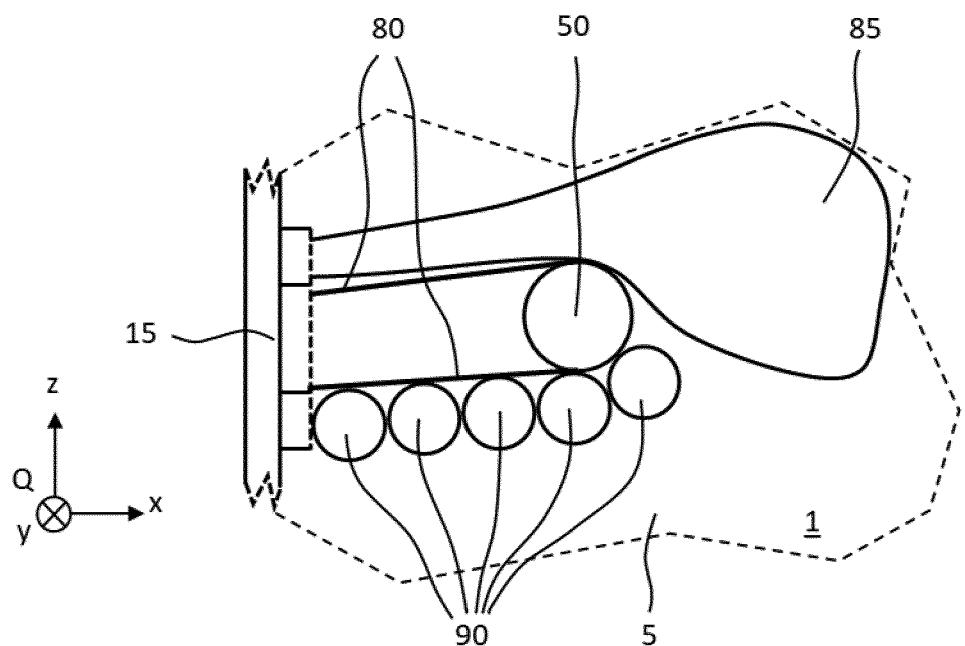
FIG. 4B shows the arrangement illustrated in FIG. 4A in a second operating state.

FIG. 4A is a simplified side view of another embodiment of the invention which is in the first operating state. A support means 50, a head airbag 85 and a knee airbag 90 which comprises a plurality of chambers and which each have in this case a gas generator which is not illustrated here are located at an end wall 15.

In the event of an accident, the support means 50 is tightly filled with gas by means of the gas generator associated therewith and, according to the embodiment shown in FIG. 3, moved by means of catch straps 80 into a support position remote from the end wall 15. Depending on the severity of the accident, alternatively or additionally the head airbag 85 and/or the knee airbag 90 are also filled with gas.

The gas generator 55 provided in the respective embodiments is operationally connected to an on-board electronic unit which is provided in a manner known per se in the motor vehicle 1 and which is not shown here for reasons of simplicity so that elements which are known per se and which are found to be advantageous can advantageously be used for detection and operation of the support means 50, the head airbag 85 and/or the knee airbag 90.

LIST OF REFERENCE CHARACTERS

1 Motor vehicle
5 Vehicle interior
10 Body
15 End wall
20 Left A-pillar
25 Right A-pillar
30 Steering wheel column trim
35 Steering wheel
40 Driver's seat
45 Passenger seat
50 Support means
55 Gas generator
60 Left end portion
65 Right end portion
70 Chamber
75 Chambers
80 Catch strap
85 Head airbag
90 Knee airbag
F Load
Q Transverse vehicle direction
x, y, z Cartesian coordinate system according to ISO 4130-1978

What is claimed is:

1. A support apparatus, comprising:
   a gas-fillable support, wherein the gas-fillable support is connectable to a gas generator, wherein the gas-fillable support is a hose, and wherein the hose is constructed of polyamide or polyethylene terephthalate;
   wherein the gas-fillable support is securable to a body of a motor vehicle and is extendible in a transverse direction over a length of the body;
   wherein the gas-fillable support has a first operating state which exists before the gas generator is activated and which has a first volume of the hose;
   wherein the gas-fillable support has a second operating state which exists after the gas generator is activated and which has a second volume of the hose which is greater than the first volume of the hose;
   wherein the gas-fillable support in the second operating state is contactable with a first end portion of the gas-fillable support against a first portion which is operationally connected to the body and is contactable with a second end portion of the gas-fillable support against a second portion which is operationally connected to the body and which is remote from the first end portion;
   wherein a first mechanical strength of the gas-fillable support in the first operating state is less than a second mechanical strength of the gas-fillable support in the second operating state and wherein the gas-fillable support increases a rigidity of the motor vehicle in the second operating state when installed in the motor vehicle; and
   a head airbag that is connected to the gas-fillable support and is disposed above the gas-fillable support and a knee airbag that is connected to the gas-fillable support and is disposed below the gas-fillable support.

2. The support apparatus according to claim 1 further comprising a strap which is connected to the gas-fillable support and is connectable to a portion which is connected to the body.

3. A motor vehicle, comprising:
   a body; and
   a gas-fillable support secured to the body, wherein the gas-fillable support is connectable to a gas generator, wherein the gas-fillable support is a hose, and wherein the hose is constructed of polyamide or polyethylene terephthalate;
   wherein the gas-fillable support is securable to a body of a motor vehicle and is extendible in a transverse direction over a length of the body;
   wherein the gas-fillable support has a first operating state which exists before the gas generator is activated and which has a first volume of the hose;
   wherein the gas-fillable support has a second operating state which exists after the gas generator is activated and which has a second volume of the hose which is greater than the first volume of the hose;
   wherein the gas-fillable support in the second operating state is contactable with a first end portion of the gas-fillable support against a first portion which is operationally connected to the body and is contactable with a second end portion of the gas-fillable support against a second portion which is operationally connected to the body and which is remote from the first end portion;
   wherein a first mechanical strength of the gas-fillable support in the first operating state is less than a second mechanical strength of the gas-fillable support in the second operating state;
   wherein the gas-fillable support in the second operating state contacts with a first end of the gas-fillable support against an A-pillar of the body and contacts with a second end of the gas-fillable support against an apparatus which is operationally connected to the body.

* * * * *